May 3, 1932. H. W. HELMS 1,856,280

COLLAPSIBLE COVER FOR DUMP BODY VEHICLES

Filed May 9, 1931

Inventor:
Harry W. Helms.
by his Attorneys.

Witness

Patented May 3, 1932

1,856,280

UNITED STATES PATENT OFFICE

HARRY W. HELMS, OF DETROIT, MICHIGAN, ASSIGNOR TO HIGHWAY TRAILER COMPANY, OF EDGERTON, WISCONSIN, A CORPORATION OF WISCONSIN

COLLAPSIBLE COVER FOR DUMP BODY VEHICLES

Application filed May 9, 1931. Serial No. 536,105.

This invention relates to vehicles of the type having an upwardly open laterally tiltable dump body especially designed for refuse collection and like purposes, and more particularly the present invention is concerned with the provision of means for enclosing the load-carrying space of the body, and has for its main object to provide an improved cover construction that is simple, light in weight and capable of being economically manufactured. A further object is to provide an improved cover construction mounted independently of the body and which is adapted to be collapsed longitudinally beyond the ends of the body so as to permit unobstructed movement to the body when it is tilted laterally for discharging its load. A still further object is to provide a cover construction composed of a plurality of collapsible sections adapted to be independently manipulated for exposing a selected portion of the load-carrying space of the body. The invention consists in certain features and elements of construction in combination, as herein shown and described, as indicated by the claims.

In the drawings:—

Figure 1:
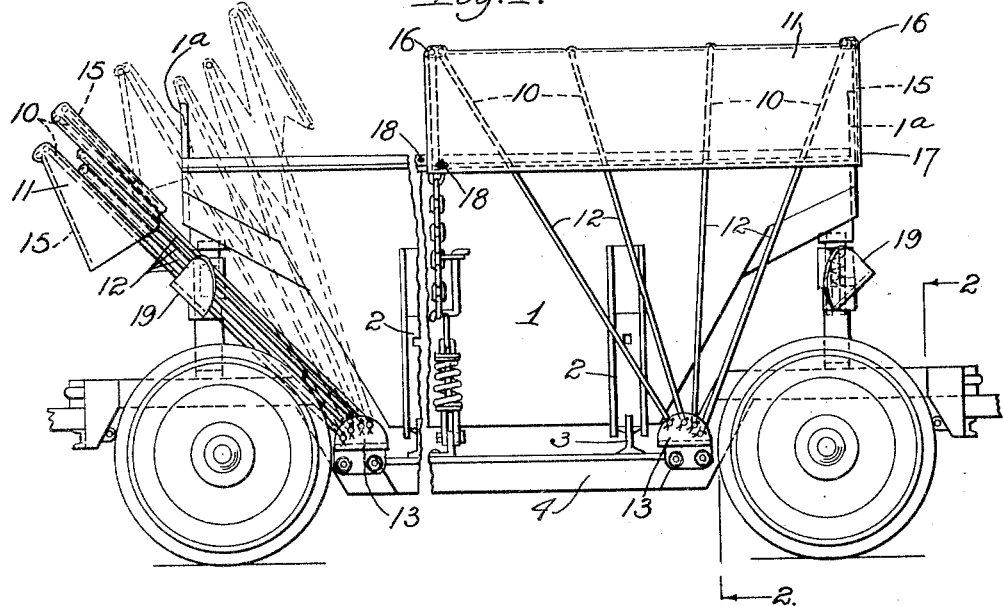
Figure 1 is a view in side elevation of a vehicle provided with a cover embodying the present invention; the view being broken for condensation and at one side of the break showing the cover in closed position, while at the other showing the cover in collapsed position; the dotted lines indicating an intermediate position during the collapsing of the cover.
Figure 2:
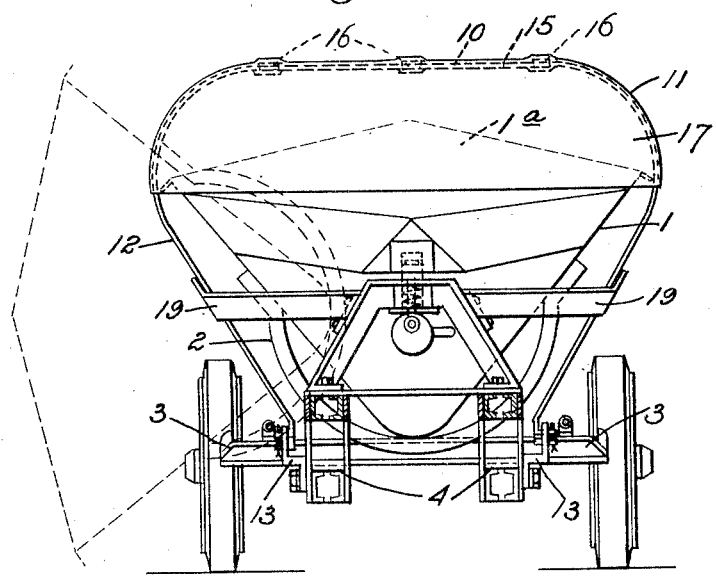
Figure 2 is substantially an end view of the vehicle with the cover in closed position and taken substantially as indicated at line, 2—2, on Figure 1.

For the purpose of illustration the vehicle shown in the drawings is of a conventional design and includes the usual upwardly open hopper body, 1, mounted on curved rockers, 2, which are carried on transversely extending rails, 3, secured to the vehicle main frame, 4. This rocker support for the body permits the same to be rolled laterally to either side for discharging its load. The covers of the present invention are mounted independently of the body so as not to alter its normal center of gravity, and are movable to a position at which the body may have free and unobstructed dumping action. It is of course to be understood that the body is normally locked to the frame in an upright position by any suitable locking mechanism.

The body cover shown in the drawings is composed of two sections which are longitudinally movable to enclose opposite portions of the load-carrying space of the body. When these cover sections are extended in body covering position they abut each other adjacent the longitudinal center of the body. It may be desired that these cover sections form a closer joint at their place of meeting, and for this purpose the adjacent ends of said cover sections may be designed to afford partial telescoping of one in the other when extended in body covering position. Each of the cover sections includes a plurality of spaced, transversely disposed, bowed ribs, 10, to which is secured a sheet of flexible material, 11, such as canvas, rubber coated fabric or the like. This sheeting extends on opposite sides slightly below the edge of the body. The ribs are provided with supporting arms, 12, on opposite sides of the body, herein shown as being continuations thereof, but it is apparent that these arms need not be integral with the ribs. The lower ends of the arms, 12, are pivotally mounted in fixtures, 13, secured to the vehicle frame, 4. It is preferable that each arm be separately pivoted in spaced relation to the others so that the arms will lie one upon the other when the cover is collapsed as shown at the left end of the vehicle in Figure 1. Furthermore the pivots for the supporting arms must be so positioned as to permit their respective bowed ribs to clear the tapered end, $1^a$, of the body when the cover section is collapsed. The ribs and supporting arms are preferably of light weight construction such as wood or metal tubing, or parts of each. The end $1^a$ of the body may be smoothly rounded so that the portion of the top covering, 11, which buckles between the ribs when the cover collapses may be pulled over the end. The ribs, 10, might be disposed in parallel vertical planes, but it is desirable to align them in the planes of their respective arms, 12, to secure a more compact unit when the cover is collapsed.

Auxiliary bowed ribs, 15, are connected by strap hinges, 16, to the end ribs, 10, of each cover section; this hinge support allows the ribs to assume vertical positions when in body covering position. The top covering, 11, extends beyond the sides of the ribs, 10, and is secured to the ribs, 15, which tend to keep the flexible top, 11, out-stretched. The rear end of each cover section is provided with a skirt portion, 17, secured to the end rib, 15; this skirt end abuts against the end portion, 1ª, of the body, in closed position, and serves to limit the forward movement of the cover section.

The supporting arm pivotal connections are positioned off center to throw the greater part of the weight of the cover toward the opposite end of the body (when in closed position) and this will normally maintain the cover in such position, and as it requires but a small additional force to hold it in extended position, I provide the usual button fasteners, 18, on the body to engage the edge of the flexible cover adjacent rib, 15, which also tends to keep the cover stretched taut.

The cover sections are supported in collapsed position by laterally extending arms, 19, on opposite sides of the body, adjacent the ends. These arms are preferably inclined at the angle which the supporting arms, 12, assume in collapsed position, at which position the entire cover section is beyond the end of the body, 1, so that said body may be rolled to and from discharging position without hindrance by said cover sections, as illustrated in the drawings.

Although I have shown and described a preferred embodiment of my invention it is manifest that it is capable of modification and rearrangement of parts without departing from the spirit and scope thereof. I do not, therefore wish to be understood as limiting my invention to the specific construction herein shown and described, except as indicated in the appended claims.

I claim:—

1. In a vehicle having a main frame and an upwardly open laterally tiltable dump body mounted thereon, a cover for enclosing the load-carrying space of the body, and means for supporting the cover independently of the body including a plurality of supporting members pivotally connected to the frame and adapted to swing said cover longitudinally clear of the body to afford unobstructed access to the load-carrying space thereof, and to permit said body to be tilted laterally for discharging its load.

2. In a vehicle having a main frame and an upwardly open laterally tiltable dump body mounted thereon, a cover for enclosing the load-carrying space of the body, and means for supporting the cover independently of the body including a plurality of supporting members pivotally connected to the frame at opposite sides of the body and adjacent the end thereof and arranged for swinging said cover in a longitudinal direction beyond the end of said body to afford unobstructed access to the load-carrying space thereof, and to permit tilting of the body to either side for discharging its load.

3. In combination with a vehicle having a main frame and an upwardly open laterally tiltable dump body mounted thereon, a cover for the body including a collapsible cover section at each end of said body and mounted independently thereof, each cover section having a plurality of supporting arms, the lower ends thereof being connected to fixtures on the frame so as to permit said arms to be folded together, causing collapse of the cover longitudinally of the body.

4. In the combination defined in claim 3, means for maintaining said cover sections in extended position over the load-carrying space of the body.

5. In the combination defined in claim 3, means for supporting said cover sections in collapsed position.

6. In the combination defined in claim 3, means for supporting the cover sections in collapsed position, comprising oppositely disposed laterally extending stops on the frame positioned to engage said supporting arms.

7. In the combination defined in claim 3, said cover sections and supporting arms being movable beyond the ends of the body in body uncovering position to permit lateral tilting of the body for discharging its load.

8. In the combination defined in claim 3, said cover sections being provided with a plurality of spaced transverse ribs connected to said supporting arms to direct the cover while it is being collapsed by the relative movement of said arms.

9. In combination with a vehicle having a main frame and an upwardly open laterally tiltable dump body mounted thereon, a collapsible cover for said body being movable thereover from one end, said cover including a plurality of spaced transverse ribs, and supporting arms connected to said ribs, the lower ends of said arms being pivotally connected to fixtures on the frame, whereby said arms may be swung about said pivotal connections for folding together, causing the cover to collapse longitudinally of the body.

10. In the combination defined in claim 9, said arms having separate spaced pivotal connections to the fixtures, whereby said arms may be folded one upon the other in collapsed position of the cover.

11. In combination with a vehicle having a main frame and an upwardly open laterally tiltable dump body mounted thereon, a cover for enclosing the load-carrying space of the body comprising a collapsible cover section at each end of the body, supporting members for said cover sections having their lower ends carried in fixtures on the frame, said cover sections being movable longitudinally of the body to collapsed position or extended over said body by the relative movement of the supporting members, and an end portion for each cover section adapted to enclose the end of the body in body-covering position.

HARRY W. HELMS.